Sept. 17, 1963     A. H. EMERY     3,103,748
BORE GAUGE
Filed Aug. 16, 1960
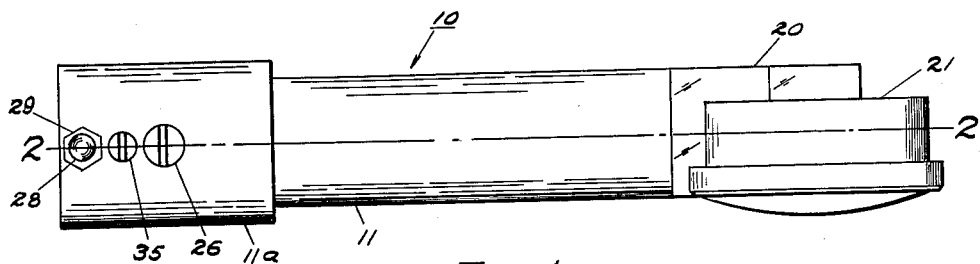
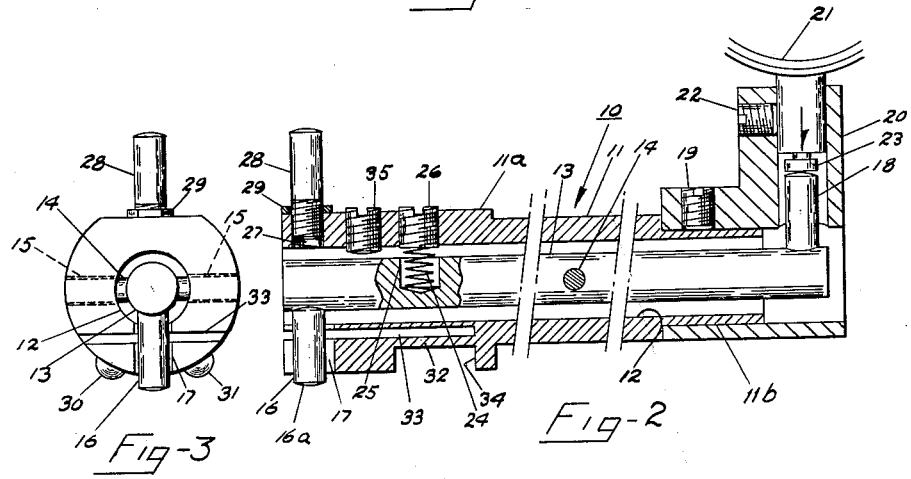
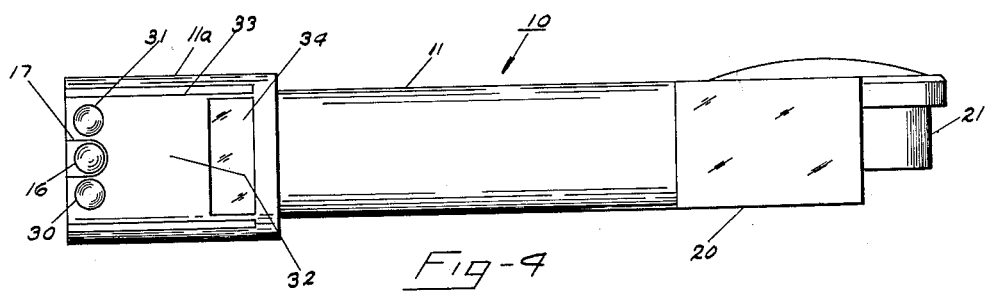
INVENTOR.
ALFRED H. EMERY
BY
AGENT

United States Patent Office 3,103,748
Patented Sept. 17, 1963

3,103,748
BORE GAUGE
Alfred H. Emery, 624 Dutchess Turnpike,
Poughkeepsie, N.Y.
Filed Aug. 16, 1960, Ser. No. 49,858
2 Claims. (Cl. 33—178)

This invention relates to bore gauges and more particularly to a bore gauge of the dial indicator type having a one-piece body which includes centralizing means and an adjustable pre-set gauge constancy means.

Dial bore gauges as heretofore known are constructed with a plurality of closely fitted moving parts including centralizing plungers with an equalizing device for the same, a reciprocating gauging plunger, a transfer means for operating the dial indicator, a longitudinal plunger interconnecting the gauging plunger and the transfer unit, and guide-ways or other form of bearing means for supporting these various moving parts in cooperative engagement within the gauge body.

It will be obvious, and experience sas confirmed the fact, that gauges constructed in this manner are costly to manufacture and difficult to maintain in good working order. The environment of ordinary daily use, that is, dust, dirt, cutting and grinding liquid compounds, etc., all serve to eventually foul the close-clearance moving parts of the gauge. In addition, a gauge may be subjected to accidental jarring or other form of abuse which could change the indicator reading from the over-all dimension for which the gauge has been set. As a result, it is customary practice to frequently refer the gauge to a master gauge to check the constancy of the original setting. This not only takes the user's time but also causes continual wear on the surfaces of the master gauge.

Conventional bore gauges are usually adapted to accommodate an external adjustable range extension means whereby a single gauge proper may be used in connection with a wide range of diameters. The usual mode of final adjustment and fixing of the range extension to the particular diameter for which the gauge is to be used has long been a more or less cut and try method which leaves much to be desired particularly as to the overall time required.

Accordingly, it is a primary object of this invention to provide a dial bore gauge having a one-piece body with a minimum of moving parts therein so arranged as to overcome the above mentioned difficulties.

It is a further object of this invention to provide a bore gauge according to the previous object in which the moving parts thereof are arranged in a relatively loose manner within the body of the gauge, that is, confined areas where foreign matter can lodge and create binding in the moving parts are avoided.

Another object is to provide a bore gauge having a centralizing means comprised of a part of the body per se of the gauge.

Another object is to provide a bore gauge having a self-contained pre-set checking means adapted to instantly reveal the constancy of the setting of the gauge dimension determining means.

A still further object is to provide a bore gauge that is quicker and easier to set to a desired over-all diameter dimension.

Other objects and advantages of this invention will be pointed out in, or be obvious from, the specifications and claims, as will obvious modifications of the single embodiment shown in the drawing in which:

FIGURE 1 is a side elevational view of a bore gauge according to this invention;

FIGURE 2 is a reduced fragmentary cross-sectional view, taken along the line 2—2 of FIGURE 1;

FIGURE 3 is an end view of the gauge shown in FIGURE 2; and

FIGURE 4 is side elevational view of the opposite side of the gauge illustrated in FIGURE 1 showing, in particular, the configuration of that part of the gauge body comprising the equalizing means and the centralizing buttons affixed thereto.

Referring now to the drawing, there is shown in FIGURE 1 a preferred embodiment, generally indicated by numeral 10, of the new gauge. The gauge body 11 may be fabricated from cylindrical stock and has one end portion 11b adapted to receive and hold the frame of a dial indicator 21 while the other end portion may be designated as a gauging head 11a.

As shown in detail in FIGURE 2, the body 11 of the gauge has a longitudinal central bore 12 within which a lever 13 is disposed loosely. The lever 13 carries at its midpoint (for a 1:1 ratio) a tight fitting pivot pin 14 (see FIGURE 3) which, in turn, is free to rotate within aligned holes 15, one on each side of the gauge body 11. A gauging pin 16 is rigidly secured to the end of lever 13 (the longitudinal axis of the pin being normal to the longitudinal axis of the lever) within the gauging head 11a. The overall length of pin 16 is such that its end remote from the lever 13 will extend through clearance opening 17 formed as a bifurcation in the reed-like section 32 (more particularly described hereinafter) of the gauging head 11a to a point slightly beyond the outside face of the head 11a. The other end of the lever 13, that is, the end within the mount for the dial indicator 21, has an anvil 18 rigidly secured thereto and extending in a direction opposite to pin 16. The length of anvil 18 is such that the over-all dimension along the longitudinal axis of both anvil 18 and pin 16 when taken with regard to the distances along the longitudinal axis of lever 13 each way from the pivot 14 thereon, form equal triangles for a 1:1 ratio.

The dial indicator 21 may be secured to the gauge body 11 in any well known way. In the drawing, a housing 20 is shown secured to the body 11 by means of screw 19, and the frame of the indicator 21 is secured within the housing by means of screw 22 so that motion of anvil 18 is transmitted by direct contact to the indicator actuator plunger 23. Spring tension incident to the internal mechanism (not shown) of standard dial indicators urges the actuator plunger 23 outwardly from within the indicator housing in the direction shown on the drawing. In the gauge according to this invention, the force exerted by the indicator tension is overcome by a compression spring 24 arranged between the lever 13 and the gauge body 11. As a manner of convenience for mounting this spring 24, and adjusting the force exerted by it, the same is arranged with one of its ends in a bore 25 in lever 13 relatively close to the gauging pin 16 and with its other end against an adjusting screw 26 threaded in the wall of body 11. With the force exerted by spring 24 being greater than that exerted by the internal mechanism of the dial indicator, the gauging point 16a at the extreme outer end of gauging pin 16 is always urged to an extended position relative to the gauge body 11 and, accordingly, the gauging point will follow any dimensional variance of the bore being measured and the indicator 21 will follow and visually indicate a similar movement transferred to the anvil 18 via lever 13.

A range rod 28 may be secured to the gauging head 11a at a point diametrically opposite the gauging pin 16 through the medium of a threaded hole 27 in the gauging head portion 11a of the gauge body 11. When adjusted to the desired axial length, the range rod 28 may be locked in position by nut 29. The outer or exposed ends of the range rod 28 and the movable gauging pin 16 comprise the contact surfaces for measuring a bore and are the equivalent of the contact surfaces of an inside caliper gauge.

In order to provide centralizing means to permit accurate determination of a bore diameter through the use of a bore gauge, additional contact points adapted to slidably engage a workpiece surface and having an equalized pressure thereon must be provided. In the gauge according to this invention, such additional contact points are provided by centralizing buttons 30 and 31 affixed to the head 11a and positioned radially equidistant from and in the same plane as the gauging point 16a at the extreme outer end of gauging pin 16. A single resilient reed-like section 32 is formed (see FIGURE 4) in the head 11a through the means of a slot 33 and a partial groove 34. The buttons 30 and 31 are located on the reed-like section 32 thus formed in the head 11a and hence, when both are slightly depressed, are subject to a uniform tension. Accordingly, these buttons, together with the outer exposed end of rod 28, serve as a centralizing means to accurately center the gauge within a bore.

In order to set the gauge herein described to any master gauge diameter, three steps are required. First, the frame of the indicator 21 is depressed within its housing 20 until it has reached its innermost limit, thus depressing the anvil 18 and retracting gauging pin 16 via the clockwise movement of lever 13 until the gauging point 16a retracts beyond the limit of the smallest diameter which the final setting is intended to check. Second, the bore gauge is inserted within the master gauge and rod 28 adjusted lengthwise so that there is a slight tension (due to the resiliency of the reed-like section 32) between the centralizing buttons 30, 31 and the exposed outer end of the rod 28. The rod 28 is then locked in this position by means of nut 29. Third, while the gauge is still within the master gauge, the indicator 21 is moved outwardly from within its housing 20 thereby allowing the lever 13 to swing counterclockwise about its pivot 14 until the gauging point 16a is in contact with the wall of the master gauge bore. Thereafter, a continuing outward movement of the indicator 21 within its housing 20 will cause the pointer of the dial indicator to come to a zero reading on the dial, at which position the indicator is locked in the housing by means of screw 22, and the gauge is ready for use.

It will be noted that the measurements obtained through the use of the herein described bore gauge may be read directly on the dial indicator and are not inverted as in the usual case. This is because the lever 13 moves in a direction away from the exposed end of the indicator actuator plunger 23 when gauging. This construction provides for true indicator readings without resorting to special dials or indicators with reversed mechanism. When using the gauge described herein it will be seen that, as the bore gets smaller, the indicator hand will move in a counterclockwise direction from the zero reading and, as the bore gets larger, the indicator hand will move in a clockwise direction from the zero reading. In other words, the indicator will read in the same manner as that on dial snap gauges, comparators, etc.

The bore gauge according to this invention also includes a means for quickly checking the constancy of the oringinal setting of the gauge without continual reference to a master gauge. This means is comprised of an adjustable stop 35 threaded in the wall of the gauge body adjacent the head end 11a thereof as shown whereby the clockwise movement of lever 13 may be limited to a position thereof corresponding to a full revolution of the dial pointer less than the specific indicator reading noted at the end of the first part of step 3 of the gauge setting procedure noted above. Another method for setting the stop 35 would be to adjust the same to limit further clockwise movement of the lever 13 to correspond to one full revolution of the dial pointer less than the zero reading established at the conclusion of the second part of step 3 of the gauge setting procedure noted above. With the stop 35 positioned according to either of the above methods, the constancy of the gauge setting may be checked at any time by depressing the gauging pin 16, by finger pressure for example, until further inward movement thereof is resisted by the stop 35 engaging lever 13, and observing the indicator reading. If there is any variance of the difference between an initial reading taken as noted above and the depressed gauging pin reading, the user will know that the bore gauge setting has changed and that it must be reset from the master gauge.

From the above description of the construction and operation of the bore gauge according to this invention, it will be obvious that all of the objects heretofore set forth in connection with the gauge have been satisfied. The body, including the gauge centralizing means, is of one-piece construction. The gauge constantcy checking means is also mounted in the one-piece body. The moving parts of the gauging mechanism have been reduced to a one-piece construction roughly in the form of the letter Z, and the same is mounted on a single pivot point arranged within a relatively large bore formed in the one-piece gauge body.

Due to the specific construction of the gauge, it is easier and quicker to set for the determination of a bore diameter and, since the gauge contains a built-in stop means whereby the movement of its internal parts may be limited to correspond to a predetermined reading of the dial indicator, the constancy of the gauge setting may be checked by a user at any time without reference to a master gauge.

I claim:

1. In a dial bore gauge including an elongated one-piece body having a longitudinal axial bore extending completely therethrough, one end portion of the body being adapted as a mount for a dial indicator, the other end portion of the body being adapted as a gauging head, a lever arranged within the bore and extending substantially the length thereof, the lever being pivoted at its mid-point on bearing means including in said body, a gauging pin affixed to one end of the lever and having an exposed end projecting through a clearance defined in the head end portion of the body, the exposed end of the pin being adapted to slidably engage a workpiece surface under measurement, an anvil affixed to the other end of the lever and having its end remote from the lever adapted to engage the dial indicator operating mechanism, the pin and the anvil extending in opposite directions in a common plane through the central longitudinal axis of the lever and being of the same over-all length reckoned from the said lever axis, a range rod fixed to the said head end of the body and having an exposed end for slidably engaging a portion of said workpiece surface diametrically opposite the surface engaged by the exposed end of the gauging pin, whereby displacements in response to movement of the gauging pin are transmitted via the pivoted lever and the anvil for registering on the dial indicator, the improvement comprising a stop means adjustably fixed in and extending through the wall of said body adjacent the head end thereof into said bore and adapted to limit movement of the said lever about its pivot point to a predetermined position.

2. A dial bore gauge according to claim 1 including also a single reed-like resilient element formed from and defined within a section of the wall of the said head portion of the said body and parallel to the longitudinal axis of the body, the said clearance for the said gauging pin being defined by a bifurcation in the single reed-like section.

References Cited in the file of this patent

UNITED STATES PATENTS

| | | |
|---|---|---|
| 2,016,659 | Tydeman | Oct. 8, 1935 |
| 2,229,748 | Lawrence | June 28, 1941 |
| 2,429,511 | Emery | Oct. 21, 1947 |
| 2,802,276 | Straw | Aug. 13, 1957 |

FOREIGN PATENTS

| | | |
|---|---|---|
| 228,682 | Switzerland | Dec. 1, 1943 |